S. I. FEKETE AND S. G. BAITS.
AUTOMOBILE FRAME MEMBER AND FRAME.
APPLICATION FILED NOV. 17, 1919.

1,399,201. Patented Dec. 6, 1921.

INVENTORS:
Stephen J. Fekete +
Stuart S. Baits by Macleod, Calver, Copeland & Dike, Attys.

UNITED STATES PATENT OFFICE.

STEPHEN I. FEKETE AND STUART G. BAITS, OF DETROIT, MICHIGAN, ASSIGNORS TO ESSEX MOTORS, OF DETROIT, MICHIGAN, A CORPORATION OF MICHIGAN.

AUTOMOBILE FRAME MEMBER AND FRAME.

1,399,201.      Specification of Letters Patent.      Patented Dec. 6, 1921.

Application filed November 17, 1919. Serial No. 338,462.

*To all whom it may concern:*

Be it known that we, STEPHEN I. FEKETE and STUART G. BAITS, subject of the King of Hungary and citizen of the United States, respectively, residing at Detroit, county of Wayne, State of Michigan, have invented a certain new and useful Improvement in Automobile Frame Members and Frames, of which the following is a specification, reference being had therein to the accompanying drawings.

Our present invention relates to frame members and frames for motor vehicles. As is well known to those skilled in the art, it is of the utmost importance that an automobile frame shall have maximum rigidity without unnecessary weight. That form of rigidity which resists the diagonal twisting of the frame is of particular importance, especially when the frame is to be used with closed bodies, since any twisting of the frame places strains upon the body which distort it and prevent the doors and windows from operating properly as well as causing body noises when the vehicle is in operation. Rigidity of the frame is almost equally important in open cars such as touring cars, phaetons and runabouts.

Heretofore, it has been customary to make the frames of automobiles of a channel with the flanges of the channel horizontal. Frequently, some of the cross members of the frame have been tubular.

Our present invention affords a new frame member which may be employed for one or more cross members of the frame or for the side rails or may be used for both side rails and cross members.

Our novel frame member consists essentially of sheet metal bent into a hollow member of polygonal cross section, one or more faces of said member being extended to form a flange. We find in practice that a frame member constructed in this way has a rigidity considerably greater than a tubular member of the same size and containing an equal amount of metal. We also find that an automobile frame constructed from such members is much stiffer and in particular resists diagonal twisting very much better than a frame of ordinary construction even when supplied with tubular cross members.

The invention will be fully understood from the following description when taken in connection with the accompanying drawings, and the novel features thereof will be pointed out and clearly defined in the claims at the close of this specification.

In the drawings, Figure 1 is a plan view of a frame member embodying the invention.

Figure 1:
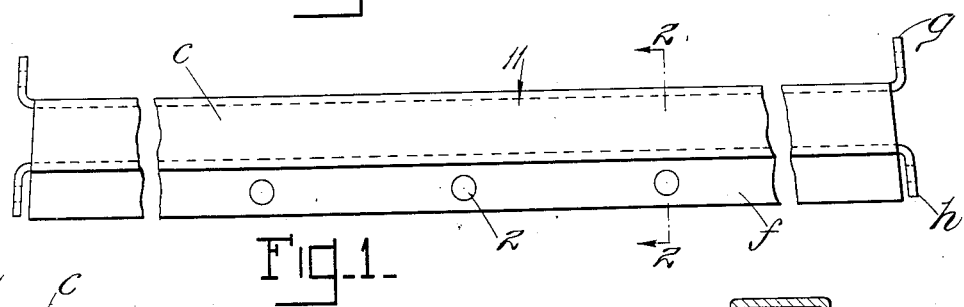
Figure 2:
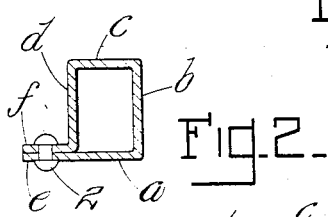
Fig. 2 is a cross section on line 2—2 of Fig. 1.
Figure 3:
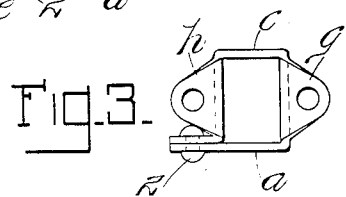
Fig. 3 is an end view of the frame member shown in Fig. 1.

Referring now to the drawings and particularly to Figs. 1, 2 and 3, the frame member is composed of a sheet of metal 11 bent into a polygonal shape and having flat faces *a*, *b*, *c* and *d*. The bottom face *a* is extended as shown at *e* and the adjacent side face *d* is extended as shown at *f* in a plane parallel to the bottom face. These extensions lie in contact with each other and together form a flange for the frame member. The two extensions *e* and *f* are secured together in any suitable manner, as for instance, by the rivets 2. We prefer to have the flange lie in the plane of the bottom face, and this is the preferred form, but the invention is capable of embodiment in other forms. At the ends of the frame member, the side faces are shaped and bent to form lugs *g* and *h* by means of which the frame member is secured to the rest of the frame.

Figure 4:
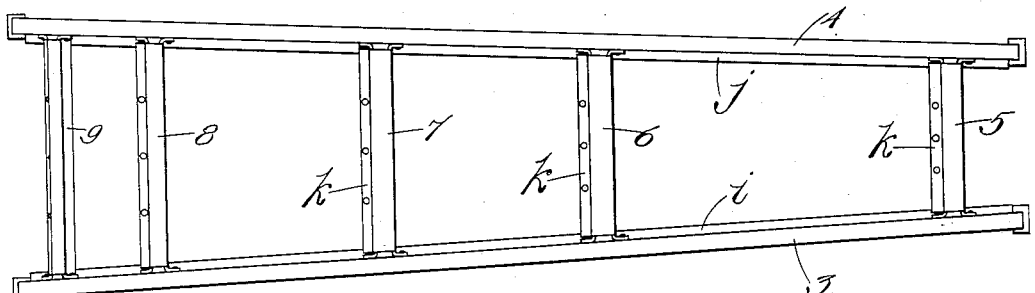
Fig. 4 is a plan view of an automobile frame, all the members of which are made in accordance with our present invention.
Figure 5:
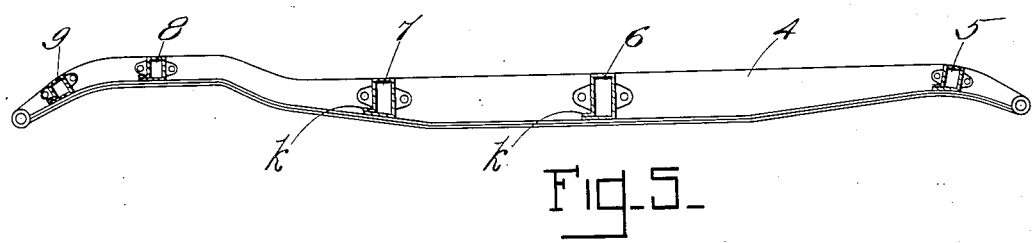
Fig. 5 is a section on the center line of the frame shown in Fig. 4.
Figure 6:
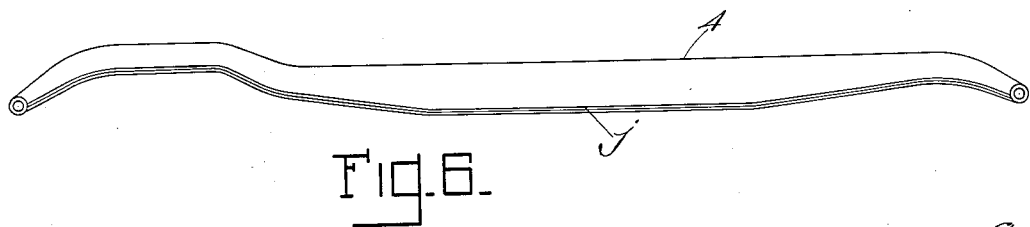
Fig. 6 is a detail view of one of the side rails shown in Fig. 4.

Referring now to Fig. 4, there is shown a frame composed entirely of frame members like that shown in Fig. 1. The side rails 3 and 4 of the frame are provided with flanges *i* and *j* at the lower inside edges, and the cross members 5, 6, 7, 8 and 9 are provided with flanges *k* at the rear lower edges of the respective members. This frame proves to have a very great rigidity and resists the diagonal twisting which an automobile is subjected to when one front wheel and the opposite rear wheel are higher than the other two wheels. This occurs when the car is driven diagonally through a deep gutter or furrow or over a curbstone.

Figure 7:
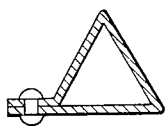
Figs. 7 and 8 are cross sections of frame members embodying our invention in modified form.
Figure 8:
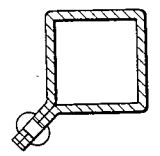

Other forms of frame members are shown in Figs. 7 and 8. In Fig. 7 there is shown a frame member having a triangular cross section, and in Fig. 8 there is shown a frame member having a square cross section but the flanges are extended along a diagonal of the square.

What we claim is:

1. An automobile frame having side members and cross tie members uniting the said side members, said side members and cross members being each composed of sheet metal bent to form a hollow member of polygonal cross section closed on all sides throughout its length, a side of the polygon where it meets an adjacent side to form a corner being extended to form a lateral flange throughout the length of said member, the cross members extending transversely between the side members, the ends of the side faces of the cross members being extended and bent to form lugs which contact with the faces of the side members and are secured thereto.

2. An automobile frame having side members and cross tie members uniting the said side members, said side members and cross members being each composed of sheet metal bent to form a hollow member of polygonal cross section closed on all sides throughout its length, a side of the polygon where it meets and adjacent side to form a corner being extended to form a lateral flange throughout the length of said member, the cross members extending transversely between the side members and resting on the flanges of the side members, the ends of the side faces of the cross members being extended and bent to form lugs which contact with the faces of the side members and are secured thereto.

3. An automobile frame having side members and cross tie members uniting the said side members, said side members and cross members being each composed of sheet metal bent to form a hollow member of polygonal cross section closed on all sides throughout its length, a side of the polygon where it meets an adjacent side to form a corner being extended to form a lateral flange throughout the length of said member, the flanges of the side members being at the bottom thereof and projecting toward the inner side of the car, the cross members extending transversely between the side members and resting on the flanges of the side members, the ends of the side faces of the cross members being extended and bent to form lugs which contact with the faces of the side members and are secured thereto.

4. An automobile frame having side members and cross tie members uniting the said side members, said side members and cross members being each composed of sheet metal bent to form a hollow member of polygonal cross section closed on all sides throughout its length, a side of the polygon where it meets an adjacent side to form a corner being extended to form a lateral flange throughout the length of said member, the flanges of the side members being at the bottom thereof and projecting toward the inner side of the car, the cross members extending transversely between the side members and resting on the flanges of the side members, the ends of the side faces of the cross members being extended and bent to form lugs which contact with the faces of the side members and are secured thereto, the ends of the side faces of the side members being also extended and bent to form lugs, whereby said side members may be secured to other frame members.

5. An automobile frame having side members and cross tie members uniting the said side members, said side members and cross members being each composed of sheet metal bent to form a hollow member of polygonal cross section closed on all sides throughout its length, two adjacent sides where they meet to form a corner being extended to form lateral flanges which lie in contact with each other and extend throughout the length of said member, the flanges of the side members being at the bottom thereof and projecting toward the inner side of the car, the cross members extending transversely between the side members and resting on the flanges of the side members, the ends of the side faces of the cross members being extended and bent to form lugs which contact with the faces of the side members and are secured thereto.

In testimony whereof we affix our signatures.

STEPHEN I. FEKETE.
STUART G. BAITS.